United States Patent [19]

Bruner

[11] Patent Number: 5,009,254

[45] Date of Patent: Apr. 23, 1991

[54] APPARATUS TO FILL SEED/FERTILIZER DRILLS

[76] Inventor: Gerald Bruner, Box 15, Conrad, Mont. 59425

[21] Appl. No.: 439,635

[22] Filed: Nov. 20, 1989

[51] Int. Cl.$^5$ ............................................. B65G 67/06
[52] U.S. Cl. ..................................... 141/35; 414/526; 222/412; 141/234
[58] Field of Search ................. 141/35, 248, 236, 234, 141/256, 231; 414/300, 303, 326, 343, 346, 526; 222/412, 413, 272, 273, 278

[56] References Cited

U.S. PATENT DOCUMENTS

| 2,684,185 | 7/1954 | Mylor | 222/177 |
|---|---|---|---|
| 2,961,126 | 11/1960 | Craig | 222/14 |
| 3,439,819 | 4/1969 | Quanbeck | 222/413 |
| 3,453,977 | 7/1969 | Sorenson | 222/272 |
| 3,616,973 | 11/1971 | Hartley | 222/330 |
| 3,837,538 | 9/1974 | Wiegelmann | 222/178 |
| 3,848,772 | 11/1974 | Aanestad et al. | 222/145 |
| 3,944,090 | 3/1976 | Flood | 141/256 |
| 4,113,148 | 9/1978 | Ernst | 222/139 |
| 4,154,376 | 5/1979 | Jones | 222/330 |
| 4,174,740 | 11/1979 | Tobler | 141/1 |
| 4,274,790 | 6/1981 | Barker | 414/502 |
| 4,583,905 | 4/1986 | Scherr | 414/505 |

FOREIGN PATENT DOCUMENTS 2013288 10/1971 Fed. Rep. of Germany ...... 414/526
2317898 10/1973 Fed. Rep. of Germany ...... 414/526

Primary Examiner—Ernest G. Cusick
Attorney, Agent, or Firm—Allegretti & Witcoff, Ltd.

[57] ABSTRACT

A seed drill comprises first through fourth bins and a distributing mechanism. The bins have upper edges defining first and second openings. The upper edges and the openings are substantially coplanar. The distributing mechanism distributes material from a source to the receptacles, and includes an enclosed channel to the receptacles and a mechanism for driving material within the channel from the source to the receptacles. The channel has first through fourth discharge apertures positioned, respectively, above the first and second openings, which are substantially coplanar. The upper edges of the bins, the openings, and the discharge apertures define mechanisms for gravity feeding material into the first bin through the first discharge aperture and the first opening until the material reaches the height of the first discharge aperture, for stopping flow through the first discharge aperture while the first bin stores the conveyed material gravity fed therein, for gravity feeding material from the distributing mechanism into the second bin through the second discharge aperture and the second opening, after flow to the first bin has been stopped, until the material reaches the height of the second discharge aperture, and for stopping flow through the second discharge aperture to the second bin while the second bin stores material gravity fed therein. Filling proceeds as described to the other bins.

2 Claims, 3 Drawing Sheets

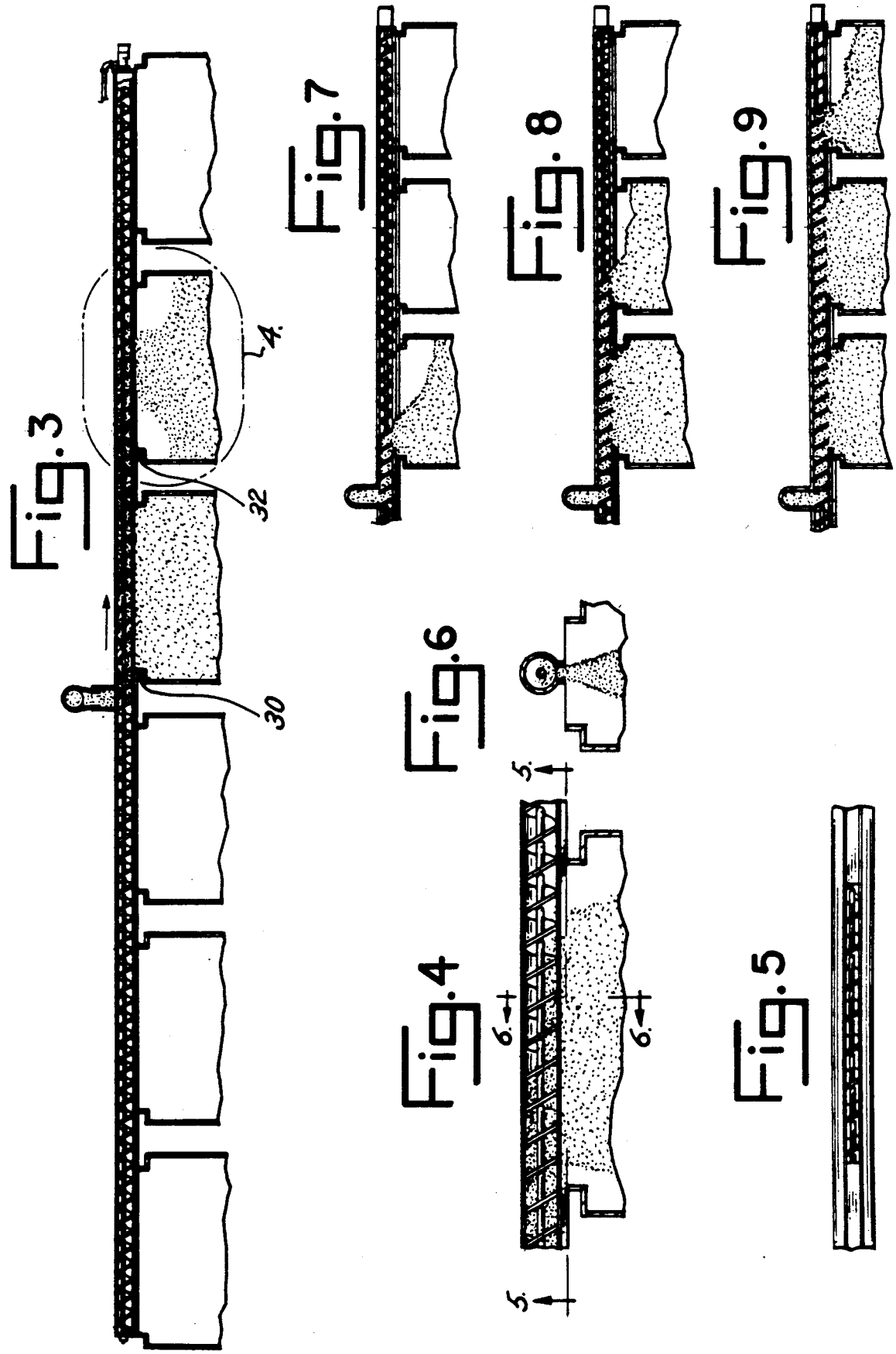

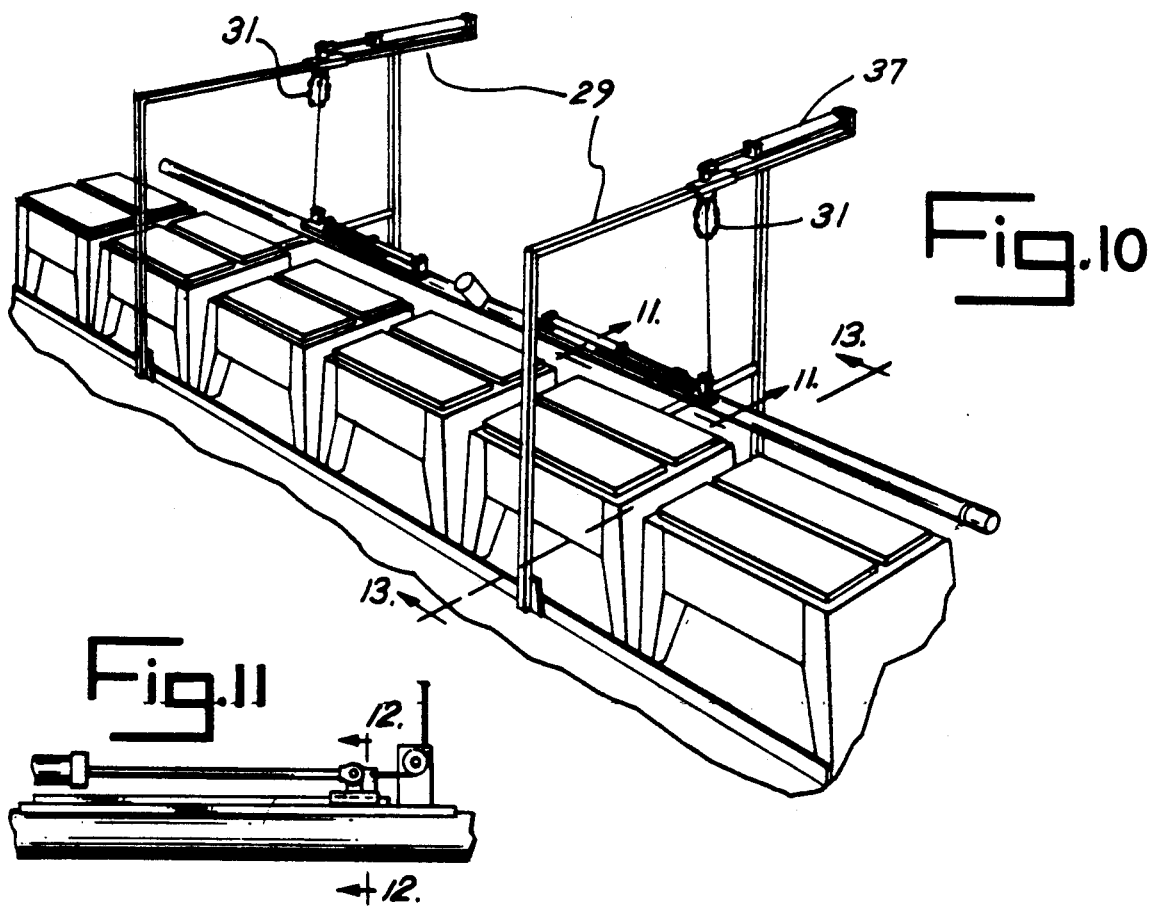
Fig.10
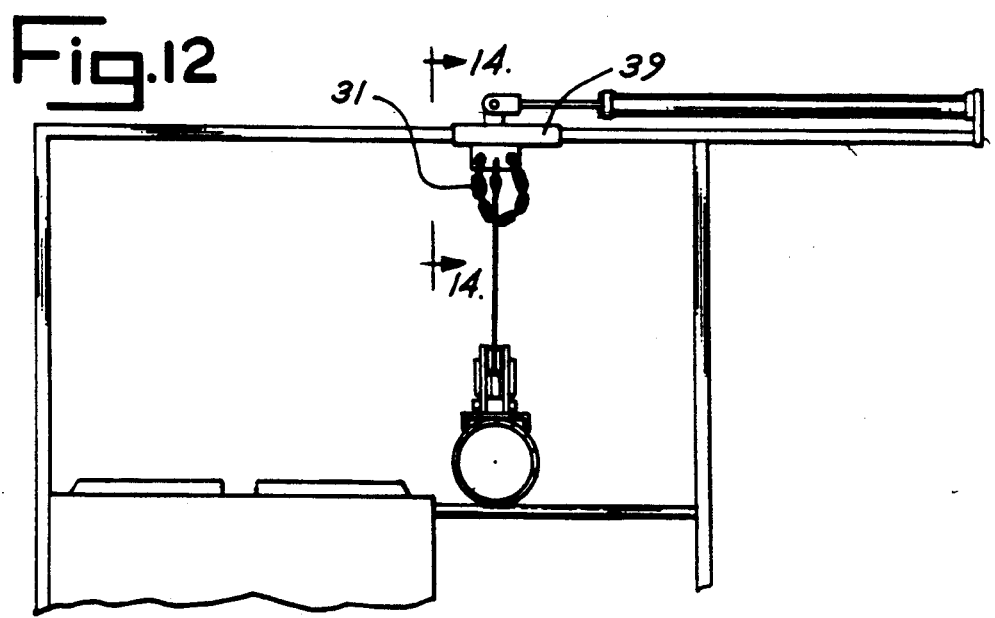
Fig.11
Fig.12

APPARATUS TO FILL SEED/FERTILIZER DRILLS

BACKGROUND OF THE INVENTION

This invention realtes to vehicle-to-storage transfer mechanisms, for the feeding of granular materials such as seeds and fertilizers from vehicles, including movable trailers, into multiple storage units, such as grain bins, and more particularly, to such mechanisms which include augers.

In the transfer of granular materials such as seeds and fertilizers from vehicles such as trucks and movable trailers, into storage units, such as grain bins, it has been common in the past to have multiple storage units into which granular materials must be placed from multiple vehicles, or single vehicles carrying repeated loads, or vehicles having loads of volume in excess of the volume of any single storage unit. In such situations, it has been common to jockey equipment about. A result has been substantial wasted time and energy, among other undesired results.

SUMMARY OF THE INVENTION

In a principal aspect, the present invention constitutes highly desirable apparatus for distributing granular materials from a mobile source to a plurality of receiving means. The apparatus comprises, in combination, first and second receiving means, and distributing means, of certain structure and function. The first receiving means is, more specifically, first means for receiving granular material. The second receiving means is, more specifically, second means for also receiving granular material. The first receiving means has an upper edge defining a first opening, and the second receiving means has an upper edge defining a second opening. The upper edges and the first and second openings are in spaced relationship with each other and are substantially coplanar. The distributing means is means for distributing granular material from the source to the first and second receiving means. The distributing means includes a substantially enclosed channel extending from the source to the receiving means. The distributing means further includes means for drivably conveying granular material within the substantially enclosed channel from the source to both of the receiving means.

The channel has a first discharge aperture positioned above the first opening and a second discharge aperture positioned above the second opening. The discharge apertures are in spaced relationship with each other and are substantially coplanar. The upper edge of the first receiving means, the first opening, and the first discharge aperture are constructed and arranged to define means for gravity feeding substantially all of the conveyed granular material from the distributing means into the first receiving means through the first discharge aperture and the first opening until the granular material reaches the height of the first discharge aperture. The edge, first opening and first discharge aperture are so constructed and arranged for substantially stopping all the flow of the granular material through the first discharge aperture to the first receiving means while the first receiving means stores substantially all of the conveyed granular material gravity fed therein.

The upper edge of the second receiving means, the second opening and the second discharge aperture are constructed and arranged to define means for gravity feeding substantially all of the conveyed granular material from the distributing means into the second receiving means through the second discharge aperture and the second opening, after the flow of the granular material to the first receiving means has been stopped, until the granular material reaches the height of the second discharge aperture. The upper edge of the second receiving means, the second opening and the second discharge aperture are so constructed and arranged for substantially stopping the flow of the granular material through the second discharge aperture to the second receiving means while the second receiving means stores substantially all of the conveyed granular material gravity fed therein.

Advantages of the invention include elimination of the need to move equipment about, in such situations as described in relation to the prior art.

BRIEF DESCRIPTION OF THE DRAWINGS

The preferred embodiment of the invention will be described in relation to the accompanying drawing, having seven figures, briefly described as follows:

FIG. 3 is a detailed, horizontal, cross-sectional view of the distribution auger illustrated in FIGS. 1 and 2;

FIG. 4 is a detailed, partial sectional view of the distribution auger illustrated in FIG. 3, in the area circled 4, showing the relationship of the distribution auger and the openings in the top of the drill, to receive seed as it is discharged from the bottom of the distribution auger;

FIG. 5 is a bottom view taken along section line 5—5 of FIG. 4 illustrating one of the discharge ports on the bottom of the distribution auger;

FIG. 6 is a detailed side sectional view taken along section line 6—6 of FIG. 4 illustrating, in further detail, one of the discharge ports on the bottom of the distribution auger; and FIG. 7 is a view similar to FIG. 4 showing progression of seed into the first bin of the invention.

FIG. 8 is a view similar to FIG. 4 showing the progression of seed to the second bin of the invention after the first bin has been filled.

FIG. 9 is a view similar to FIG. 4 showing the progression of seed to the third bin of the invention after the second bin has been filled.

FIG. 10 is a perspective view of the apparatus of the preferred embodiment showing, in more detail, the brackets for mounting the distribution auger.

FIG. 11 is a detailed, horizontal view of the hydraulic cylinder shown in FIG. 10.

FIG. 12 is a detailed, cross-sectional view taken along line 13—13 of FIG. 10 illustrating the suspension of the distribution auger from the brackets by cables.

DETAILED DESCRIPTION OF THE PREFERRED EMBODIMENT

Figure 1:
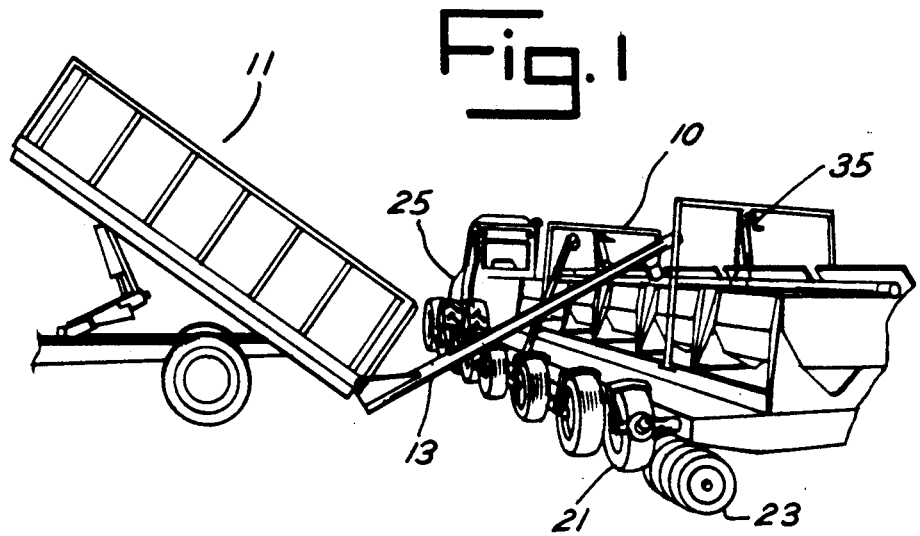
FIG. 1 is a perspective view showing the discharge of granular material such as seed from a truck to a seed drill utilizing the supply and distribution augers of the present invention.
Figure 2:
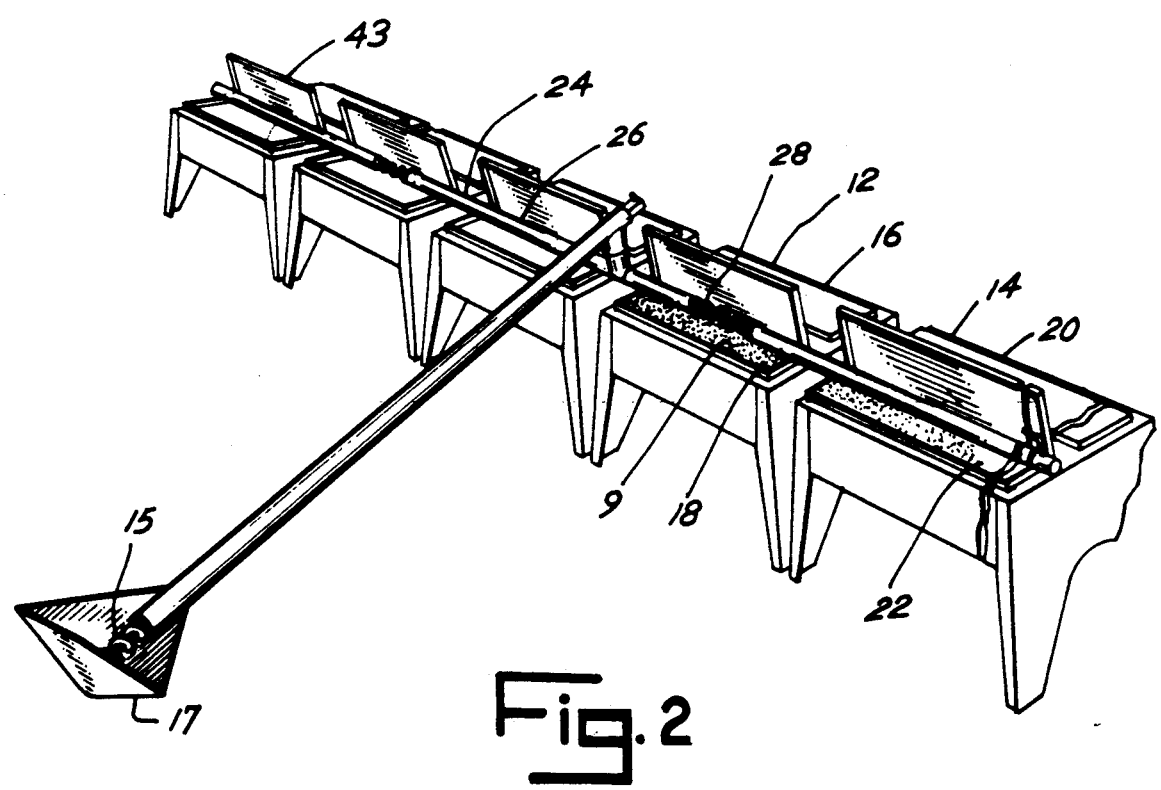
FIG. 2 is a perspective view of the apparatus of the preferred embodiment, showing, in more detail, the relationship of the supply or transfer auger and the distribution auger.

Referring to FIG. 1, the preferred embodiment of the present invention constitutes one possible form of an invented apparatus for distributing granular materials from a mobile source 11 such as a truck hopper to a plurality of receiving means, such as the bins of a seed drill. The apparatus 10 comprises, in combination, a plurality of receiving means, such as a first and second receiving means, and distributing means, of certain structure and function. Referring to FIG. 2, the first receiving means is, more specifically, first means for receiving granular material, and in the preferred embodiment, a seed bin 12 of a seed drill constitutes one possible and preferred form of the first receiving means. The second receiving means is, more specifically, second means for also receiving granular material, and in the preferred embodiment, a seed bin 14 of a seed drill constitutes one possible and preferred form of the second receiving means. Additional seed bins constitute additional preferred receiving means.

Referring to FIG. 1, material is fed from the mobile source 11 to the apparatus 10 by a transfer auger means 13. Referring to FIG. 2, the transfer auger means 13 includes a rotating auger 15 which moves material 9 from a hopper 17 to a distribution auger means 24, to be described. Material 9 is received in the hopper 17 from the mobile source 11 as by dumping, as shown in FIG. 1.

Also as shown in FIG. 1, the apparatus 10 of the preferred embodiment may be incorporated in a seed drill, which is a device for planting of seed. When incorporated in a seed drill, the apparatus is accompanied by the typical structures of a seed drill, including retractable towing wheels 21 and disks 23. As typical, the seed drill is towed by a vehicle 25 to a site for planting. The seed drill is then pulled behind a tractor (not shown), perpendicular to the direction of towing, and away from the truck 11 shown in FIG. 1.

Referring to FIG. 2, the first seed bin 12 has an upper edge 16 defining a first opening 18, and the second bin has an upper edge 20 defining a second opening 22. The upper edges 16, 20 and the first and second openings 18, 22 are in spaced relationship with each other and are substantially coplanar. The remaining seed bins also have such upper edges and openings in similar relationships.

The distributing means is means for distributing granular material from the mobile source ot the first and second receiving means, and in the preferred embodiment, a distributing auger means 24 constitutes one possible and preferred form of a distributing means. The distributing auger means 24 includes a substantially enclosed auger channel 26 extending from the source 11 to the receiving bins 12, 14 and the remaining bins. The distributing auger 24 further includes an auger 28, which constitutes one possible and preferred form of means for drivably conveying granular material 9 within the substantially enclosed channel 26 from the source 11 to the receiving bins.

As most preferred, the auger channel and auger 26, 28, as well as the transfer auger 13, are mounted to the seed drill structure. As shown in FIG. 10, a spaced pair of brackets 29 are positioned over the seed drill bins 12, 14 and the like. The auger channel and auger 26, 28 are suspended from the brackets by cables 31. The cables are extendable and retractable by hand crank 35, or hydraulic cylinder 37. As seen in FIG. 12, the cables 31 are mounted to sliding sleeves 39, which are slidable along the brackets 29. The sleeves are slidable manually, or by hydraulic cylinder.

The auger channel and auger 26, 28 in FIG. 2 are in an operative position atop the bins 12, 14 and the like. In a rest position, the auger channel and auger 26, 28 are fitted into holders adjacent the bins, to remain on the seed drill, for travel and ready use whenever desired. Transfer of the auger channel and auger 26, 28 to the operative position occurs by three motions. First, the auger channel and auger 26, 28 in FIG. 2 are raised from the holders by retraction of the cables in FIG. 10. Second, the auger channel and auger 26, 28 in FIG. 2 are moved laterally to a position over the operative position, by sliding of the sleeves along the brackets 31 in FIG. 10. Finally, the auger channel and auger 26, 28 in FIG. 2 are lowered into operative position.

As shown in FIG. 10, and as most preferred, hydraulic cylinders, if any, include hydraulic cylinders aligned along the top of each bracket 31, which drive lateral motion of the sleeves along the top of the brackets 31, and hydraulic cylinders aligned along the length of the auger channel and auger 26, 28 in FIG. 2, which are connected to the cables, and which pull the cables, about pulleys, to cause vertical motion of the auger channel and auger 26, 28 in FIG. 2. Bin doors 43 are opened or closed, for cooperation with the auger channel and auger 26, 28 in FIG. 2.

The transfer auger 13 is detachable from the auger channel and auger 26, 28 and is pivotable into a rest position, with the hopper 17 off the ground.

Referring to FIGS. 2-9, the channel 26 has a first discharge aperture 30 positioned above the first opening 18 and a second discharge aperture 32 positioned above the second opening 22. The discharge apertures 30, 32 are in spaced relationship with each other and are substantially coplanar. The upper edge 16 of the first receiving bin, the first opening 18, and the first discharge aperture 30 are constructed and arranged to define means for gravity feeding substantially all of the conveyed granular material 9 from the distributing auger means 24 into the first receiving bin 12 through the first discharge aperture 30 and the first opening 18 until the granular material 9 reaches the height of the first discharge aperture 30. The edge, first opening and first discharge aperture are so constructed and arranged for substantially stopping all the flow of the granular material 9 through the first discharge aperture 30 to the first bin 12 while the first bin 12 stores substantially all of the conveyed granular material 9 gravity fed therein.

The upper edge 20 of the second bin 14, the second opening 22 and the second discharge aperture 32 are constructed and arranged to define means for gravity feeding substantially all of the conveyed granular material 9 from the distributing auger means 24 into the second bin 14 through the second discharge aperture 32 and the second opening 22, after the flow of the granular material 9 to the first bin 12 has been stopped, until the granular material 9 reaches the height of the second discharge aperture 32. The upper edge 20 of the second bin 14, the second opening 22 and the second discharge aperture 32 are so constructed and arranged for substantially stopping the flow of the granular material 9 through the second discharge aperture 32 to the second bin 14 while the second bin 14 stores substantially all of the conveyed granular material 9 gravity fed therein.

In like manner, the material 9 fills additional bins outward of the first and second bins 12, 14, and on the same side of the transfer auger means 13 as the first and second bins 12, 14 fill to capacity. On completion of filling of bins 12, 14 and the additional bins on the same side, the auger 28 of the distributing auger means 24 is reversed, by reversal of a motor driving the auger.

Upon such reversal, the additional bins on the other side of the transfer auger means 13 are also filled.

With structure as now described, a device such as a seed drill, or other devices or storage structures, are readily filled, in a manner which is efficient and organized. A group of receptacles may all be filled to capacity, or, if desired, only a sub-group of adjacent receptacles may all be filled to capacity. In any circumstance, multiple positioning of augers or vehicles, as by jockeying of trucks, may be eliminated. Seed drills and like devices may be filled fully and quickly, without specialized trucks, without equipment other than the seed drill and source of granular material, and virtually without manual shoveling.

The preferred embodiment of the invention, and the invention itself, are now described in such full, clear, concise and exact terms as to enable a person of ordinary skill to make and use the invention. To particularly point out and distinctly claim the subject matter regarded as invention, the following claims conclude this specification.

I claim:

1. A seed drill including retractable towing wheels, disks and means for attachment to a tractor for pulling of the seed drill by a tractor, for receiving and distributing granular material such as seeds from a mobile source such as a truck, the seed drill being longitudinally elongated and being longitudinally symmetrical about a centerline, and further comprising, in combination:

(a) a plurality of bins for holding said granular material, including at least a first bin, a second bin, a third bin and a fourth bin, the bins being spaced longitudinally, the first and second bins being alongside the centerline and the third and fourth bins being across the centerline from the first and second bins;

each of the plurality of bins having an upper edge defining opening, the first bin having an upper edge defining a first opening, the second bin having an upper edge defining a second opening, the third bin having an upper edge defining a third opening, and the fourth bin having an upper edge defining a fourth opening;

the upper edges and openings of the plurality of bins, including the upper edges and the first, second, third and fourth openings of the first through fourth bins, being in longitudinally spaced relationship with each other and being substantially coplanar;

(b) transfer auger means and distribution auger means for distributing the granular material from the source to the plurality of bins;

the distribution auger means including a substantially enclosed auger channel extending longitudinally across the bins and further including a distribution auger for drivably conveying granular material within the auger channel from the transfer auger means to all the bins;

the auger channel having a discharge aperture positioned above each of the plurality of openings, including a first discharge aperture positioned above said first opening, a second discharge aperture positioned above said second opening, a third discharge aperture positioned above the third opening, and a fourth discharge aperture positioned above the fourth opening;

the discharge apertures being in longitudinally spaced relationship with each other and being substantially coplanar with each other and with the openings, in an operative position of the distribution auger means;

(c) the upper edge of said each bin, its opening, and the respecti discharge aperture being constructed and arranged to define means for gravity feeding substantially all of said conveyed granular material from the distribution auger means into the bin through said discharge aperture and said opening until said granular material reaches the height of said discharge aperture for substantially stopping all the flow of said granular material through said discharge aperture to said bin while said bin stores substantially all of said conveyed granular material gravity fed therein;

the upper edge of each bin, its opening and the respective discharge aperture being further constructed and arranged to define means for gravity feeding substantially all of said conveyed granular material from said distribution auger means into said bin through said discharge aperture and said opening, after the flow of said granular material to others of said bins has been stopped;

(d) the transfer auger means having a transverse extent and including a transfer auger channel extending transversely to the discharge auger channel and further including a transfer auger for drivably conveying granular material within the transfer auger channel from the source to the distribution auger means.

2. A seed drill as in claim 1 further comprising longitudinally spaced brackets mounted over the bins, cables suspending the distribution auger means from the brackets, and power means for raising, lowering and moving laterally the distribution auger means, to and from an operative position and a rest position of the distribution auger means.

* * * * *